(12) United States Patent
Smalley et al.

(10) Patent No.: US 6,752,977 B2
(45) Date of Patent: Jun. 22, 2004

(54) PROCESS FOR PURIFYING SINGLE-WALL CARBON NANOTUBES AND COMPOSITIONS THEREOF

(75) Inventors: Richard E. Smalley, Houston, TX (US); Robert H. Hauge, Houston, TX (US); Wan-Ting Chiang, Ponca City, OK (US)

(73) Assignee: William Marsh Rice University, Houston, TX (US)

( * ) Notice: Subject to any disclaimer, the term of this patent is extended or adjusted under 35 U.S.C. 154(b) by 37 days.

(21) Appl. No.: 10/068,907

(22) Filed: Feb. 8, 2002

(65) Prior Publication Data

US 2002/0127171 A1 Sep. 12, 2002

Related U.S. Application Data

(60) Provisional application No. 60/268,228, filed on Feb. 12, 2001, and provisional application No. 60/284,419, filed on Apr. 17, 2001.

(51) Int. Cl.$^7$ .................................................. D01F 9/12
(52) U.S. Cl. .................................... 423/447.1; 423/460
(58) Field of Search .......................... 423/447.1, 447.2, 423/460, 445 R

(56) References Cited

FOREIGN PATENT DOCUMENTS

| EP | 1 061 040 A1 | 12/2000 |
|----|--------------|---------|
| EP | 1 061 042 A1 | 12/2000 |

OTHER PUBLICATIONS

Tohji, et al., "Purifying single–walled nanotubes," *Nature*, vol. 383, Oct. 24, 1996, p. 679.
Bougrine, et al., "Influence of high temperature treatments on single–walled carbon nanotubes structure, morphology and surface properties," *Carbon*, vol. 39 (2001), pp. 685–695.
Hou, et al., "Purification of single–walled carbon nanotubes synthesized by the hydrogen arc–discharge method," *J. Mater. Res.*, vol. 16, No. 9, Sep. 2001, pp. 2526–2529.
Grimes, et al., "Effect of purification of the electrical conductivity and complex permittivity of multiwall carbon nanotubes," *Journal of Applied Physics*, vol. 90, No. 8, Oct. 15, 2001, pp. 4134–4137.
Zimmerman, et al., "Gas–Phase Purification of Single–Wall Carbon Nanotubes," *Chem. Mater.* vol. 12 (2000), pp. 1361–1366.
Chiang, et al., "Purification and Characterization of Single–Wall Carbon Nanotubes (SWNTs) Obtained from the Gas–Phase Decomposition of CO (HiPco Process)," *J. Phys. Chem. B*, vol. 105 (2001), pp. 8297–8301.
Chiang, et al., "Purification and Characterization of Single–Wall Carbon Nanotubes," *J. Phys. Chem. B.*, vol. 105 (2001), pp. 1157–1161.

Moon, et al., "High–Yield Purification Process of Single-walled Carbon Nanotubes," *J. Phys. Chem. B.*, vol. 105 (2001), pp. 5677–5681.
Bandow, et al., "Purification and magnetic properties of carbon nanotubes," *Applied Physics A*, vol. 67 (1998), pp. 23–27.
Duesberg, et al., "Towards processing of carbon nanotubes for technical applications," *Applied Physics A.*, vol. 69 (1999), pp. 269–274.
Rinzler, et al., "Large–scale purification of single–wall carbon nanotubes: process, product, and characterization," *Applied Physics* A, vol. 67 (1998), pp. 29–37.
Zhou, et al., "Structural characterization and diameter–dependent oxidative stability of single wall carbon nanotubes synthesized by the catalytic decomposition of CO," *Chem. Phys. Lett.*, 350 (2001), pp. 6–14.
Jeong, et al., "A new purification method of single–wall carbon nanotubes using $H_2S$ and $O_2$ mixture gas," *Chem. Phys. Lett.*, 344 (2001), pp. 18–22.
Dujardin, et al., "Purification of Single–Shell Nanotubes," *Adv. Mater.*, vol. 10, No. 8 (1998), pp. 611–613.
Dillon, et al., "A Simple and Complete Purification of Single–Walled Carbon Nanotube Materials," *Adv. Mater.*, vol. 11, No. 16 (1999), pp. 1354–1358.
Tohji, et al., "Purification Procedure for Single–Walled Nanotubes," *J. Phys. Chem. B*, vol. 101 (1997), pp. 1974–1978.
Dai, et al., "Single–wall nanotubes produced by metal catalyzed disproportionation of carbon monoxide," *Chemical Physics Letter*, vol. 260, Sep. 27, 1996, pp. 471–475.

Primary Examiner—Stuart L. Hendrickson
Assistant Examiner—Peter J Lish
(74) Attorney, Agent, or Firm—Ross Spencer Garsson; Edward T. Mickelson; Winstead Sechrest & Minick P.C.

(57) ABSTRACT

The present invention relates to a process for the purification of single-wall carbon nanotubes and the purified single-wall carbon nanotube material. Known methods of single-wall carbon nanotube production result in a single-wall carbon nanotube product that contains single-wall carbon nanotubes in addition to impurities including residual metal catalyst particles and amounts of small amorphous carbon sheets that surround the catalyst particles and appear on the sides of the single-wall carbon nanotubes and "ropes" of single-wall carbon nanotubes. The purification process removes the extraneous carbon as well as metal-containing residual catalyst particles. The process employs steps including a gas-phase oxidation of the amorphous carbon and subsequent liquid-phase reaction of a halogen-containing acid with the metal-containing species. Optionally, the single-wall carbon nanotube material may be annealed dry or in the presence of moisture. The present invention provides a scalable means for producing high-purity single-wall carbon nanotube material.

206 Claims, 2 Drawing Sheets

PROCESS FOR PURIFYING SINGLE-WALL CARBON NANOTUBES AND COMPOSITIONS THEREOF

CROSS-REFERENCES TO RELATED APPLICATION

This application claims priority from U.S. provisional application, Serial Nos. 60/268,228 filed Feb. 12, 2001, and 60/284,419 filed Apr. 17, 2001, which applications are each incorporated herein by reference.

This patent application is related to U.S. patent application Ser. No. 10/071,166, "GAS PHASE PROCESS FOR PURIFYING SINGLE-WALL CARBON NANOTUBES AND COMPOSITIONS THEREOF," to Smalley, et al., filed concurrent herewith. This United States Patent Application is also incorporated herein by reference.

This invention was made with United States Government support under Grant 5 No. NCC9-77 and Grant No. DMR-0073046 awarded by the National Aeronautical and Space Administration and the National Science Foundation, respectively. Government may have certain rights in the invention.

BACKGROUND OF THE INVENTION

Fullerenes are spheroidal, closed-cage molecules consisting essentially of $sp^2$-hybridized carbons typically arranged in hexagons and pentagons. Fullerenes, such as $C_{60}$, also known as Buckminsterfullerene, more commonly, "buckyballs," and $C_{70}$, have been produced from vaporized carbon at high temperature. Presence of a transition metal catalyst with the high temperature vaporized carbon results in the formation of single-wall tubular structures which may be sealed at one or both ends with a semifullerene dome. These carbon cylindrical structures, known as single-wall carbon nanotubes or, commonly, "buckytubes" have extraordinary properties, including both electrical and thermal conductivity and high strength.

Nested single-wall carbon cylinders, known as multi-wall carbon nanotubes possess properties similar to the single-wall carbon nanotubes, however, single-wall carbon nanotubes have fewer defects, rendering them stronger, more conductive, and typically more useful than multi-wall carbon nanotubes of similar diameter. Single-wall carbon nanotubes are believed to be much more free of defects than are multi-wall carbon nanotubes because multi-wall carbon nanotubes can survive occasional defects by forming bridges between the unsaturated carbon of the neighboring cylinders, whereas single-wall carbon nanotubes have no neighboring walls for defect compensation.

In defining the size and conformation of single-wall carbon nanotubes, the system of nomenclature described by Dresselhaus, et al., *Science of Fullerenes and Carbon Nanotubes*, 1996, San Diego: Academic Press, Ch. 19, will be used. Single-wall tubular fullerenes are distinguished from each other by a double index (n, m), where n and m are integers that describe how to cut a single strip of hexagonal graphite such that its edges join seamlessly when the strip is wrapped onto the surface of a cylinder. When n=m, the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n,0) type, since when the tube is cut perpendicular to the tube axis, the edge is a zig zag pattern. Where n≠m and m≠0, the resulting tube has chirality. The electronic properties are dependent on the conformation, for example, arm-chair tubes are metallic and have extremely high electrical conductivity. Other tube types are metallic, semimetals or semi-conductors, depending on their conformation. Regardless of tube type, all single-wall nanotubes have extremely high thermal conductivity and tensile strength.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although one structure tends to predominate. Although the laser vaporization process produces an improved yield of single-wall carbon nanotubes, the product is still heterogeneous, and the nanotubes tend to be too tangled for many potential uses of these materials. In addition, the laser vaporization of carbon is a high energy process.

Another way to synthesize carbon nanotubes is by catalytic decomposition of a carbon-containing gas by nanometer-scale metal particles supported on a substrate. The carbon feedstock molecules decompose on the particle surface, and the resulting carbon atoms then precipitate as part of a nanotube from one side of the particle. This procedure typically produces imperfect multi-walled carbon nanotubes.

Another method for production of single-wall carbon nanotubes involves the disproportionation of CO to form single-wall carbon nanotubes and $CO_2$ on alumina-supported transition metal particles comprising Mo, Fe, Ni, Co, or mixtures thereof. This method uses inexpensive feedstocks in a moderate temperature process. However, the yield is limited due to rapid surrounding of the catalyst particles by a dense tangle of single-wall carbon nanotubes, which acts as a barrier to diffusion of the feedstock gas to the catalyst surface, limiting further nanotube growth.

Control of ferrocene/benzene partial pressures and addition of thiophene as a catalyst promoter in an all gas phase process can produce single-wall carbon nanotubes. However, this method suffers from simultaneous production of multi-wall carbon nanotubes, amorphous carbon, and other products of hydrocarbon pyrolysis under the high temperature conditions necessary to produce high quality single-wall carbon nanotubes.

More recently, a method for producing single-wall carbon nanotubes has been reported that uses high pressure CO as the carbon feedstock and a gaseous transition metal catalyst precursor as the catalyst. ("Gas Phase Nucleation and Growth of Single-Wall Carbon Nanotubes from High Pressure Carbon Monoxide," International Pat. Publ. WO 00/26138, published May 11, 2000 ("WO 00/26138"), incorporated by reference herein in its entirety). This method possesses many advantages over other earlier methods. For example, the method can be done continuously, and it has the potential for scale-up to produce commercial quantities of single-wall carbon nanotubes. Another significant advantage of this method is its effectiveness in making single-wall carbon nanotubes without simultaneously making multi-wall nanotubes. Furthermore, the method produces single-wall carbon nanotubes in relatively high purity, such that less than about 10 wt % of the carbon in the solid product is attributable to other carbon-containing species, which includes both graphitic and amorphous carbon.

All known processes for formation of single-wall nanotubes involve a transition-metal catalyst, residues of which are invariably present in the as-produced material. Likewise, these processes also entail production of varying amounts of carbon material that is not in the form of single-wall nanotubes. In the following, this non-nanotube carbon material is referred to as "amorphous carbon."

There are chemical processes involving single-wall carbon nanotube manipulation for specific applications, such as, for example, "Chemical Derivatization Of Single-Wall Carbon Nanotubes To Facilitate Solvation Thereof; And Use Of Derivatized Nanotubes," International Pat. Publ. WO 00/17101, published Mar. 30, 2000, and "Carbon Fibers Formed From Single-Wall Carbon Nanotubes," International Pat. Publ. WO 98/39250, published Sep. 11, 1998, both of which are incorporated by reference herein. Many of these manipulation processes involve chemical reaction of the single-wall carbon nanotube sides and/or ends with other chemicals. These processes also often involve the physical interaction (through van der Waals or other inter-molecular forces) of nanotubes with one another or interaction of nanotubes with other matter within which they are suspended, encapsulated, or otherwise placed in proximity. Clearly, in performing a chemical or physical interaction process with nanotube material, any impurities present are likely to inhibit or modify such manipulation process and/or physical interactions making it difficult or even impossible to achieve the intended result.

One example of a nanotube interaction that has many uses is the process of self-assembly of nanotubes. Under some conditions, individual nanotubes self-assemble into "ropes" of many parallel nanotubes in van der Waals contact with one another. See, e.g., "Macroscopic Ordered Assembly of Carbon Nanotubes," International Pat. Publ. WO 01/30694 A1, published May 3, 2001, incorporated herein by reference. Likewise, individual single-wall carbon nanotube and ropes of single-wall carbon nanotube, can be caused to aggregate into large networks, which are themselves electrically conductive. This self-assembly process enables nanotubes and ropes of nanotubes to form such networks when they are suspended in a matrix of a different material. The presence of this network alters the electrical properties of a composite that includes nanotubes. The facility with which single-wall carbon nanotubes aggregate into ropes and networks is critically dependent upon the purity of the nanotube material.

Another example of nanotube manipulation is the chemical processing of nanotubes by reacting them with other chemicals to produce new materials and devices. Clearly, the presence of other species such as the transition metal catalyst or amorphous carbon material provides sites for chemical reaction processes that are distinct from the desired chemical reaction process involving the nanotube alone. As with any species involved in a chemical process, one seeks to perform that process with a pure species.

Likewise, the useful properties and behavior of nanotube-containing materials devices and articles of manufacture derive from the properties of the nanotubes themselves, and the absence of impurities in the nanotube material enhances the performance of any and all materials, devices, and articles of manufacture comprising nanotubes. Particular examples are those where the material, device, or article of manufacture must function in a high magnetic field or a chemically-active environment. Examples of such materials, device and articles would include those subjected to traditional nuclear magnetic resonance apparatus; those serving as electrodes in batteries, capacitors, sensors, and fuel cells; those implanted in or otherwise in contact with any living organism; those used in preparation of other materials requiring low-contamination environments (such as chemical apparatus, chemical storage devices, electronic materials and devices, or food processing equipment).

In environments where there are chemicals, such as oxygen, that react with the nanotubes at elevated temperatures, the presence of metallic particles reduces the temperature at which the nanotube material remains stable. This occurs because transition metals and transition metal compounds are known to catalyze the reaction of the nanotubes with other chemicals, such as oxygen, at elevated temperatures. High purity nanotubes, with the transition metal species substantially removed, would provide greater chemical stability to the nanotubes and a longer performance life to applications involving them.

SUMMARY OF THE INVENTION

The present invention relates to purified single-wall carbon nanotubes and means for their preparation. Known methods of single-wall carbon nanotube production all result in a product that contains single-wall carbon nanotube in addition to impurities such as particles of the metal catalyst used in single-wall carbon nanotube production and small amounts of amorphous carbon sheets that surround the catalyst particles and appear on the sides of the single-wall carbon nanotubes and "ropes" of single-wall carbon nanotubes produced. The present process for purification comprises oxidizing the single-wall carbon nanotube material in an oxidizing gaseous atmosphere and treating the material with an aqueous solution of a halogen-containing acid. The oxidation step can be performed in a dry atmosphere or in an atmosphere comprising water vapor. The oxidation is performed at a temperature of at least about 200° C. In one embodiment, the process also includes repetition of the oxidizing and halogen-containing acid treating cycle at the same or at higher subsequent oxidizing temperatures.

Many processing methods and articles of manufacture involving single-wall carbon nanotube are enhanced by the use of pure single-wall carbon nanotube material in which the presence of such impurities is minimized. There is a clear need for pure nanotube material and methods for its production. The present invention relates to such high-purity nanotube material, specific means for the production of the material, and articles of manufacture incorporating said material. The purification methods disclosed involve gas and liquid phase chemical treatments of the as-produced single-wall carbon nanotube material. The methods disclosed are scalable to provide for large amounts of high purity single-wall carbon nanotube material.

The material of this invention provides a superior nanotube material for applications because of the relative absence of impurities of metal and amorphous carbon, both of which exhibit different chemical, physical and electrical behavior than the single-wall carbon nanotube themselves.

Single-wall carbon nanotubes, purified to remove residual metal, are more stable and resistant to chemical attack at temperatures where metal-containing nanotube material would be chemically reactive. One example of such chemical attack would be oxidation of the nanotube material in air at temperatures exceeding 200° C. Without being bound by theory, it is believed that the presence of transition metal impurities in the nanotube material catalyzes the oxidation of that material; and removal of the transition metal impurities would increase the oxidation temperature of nanotube material in air to over 600° C. The present invention enables the chemical processing of nanotubes by providing high purity single-wall carbon nanotubes for reactions with other chemicals to produce new materials and devices. The present invention also enables aggregation of the single-wall carbon nanotubes into ropes and networks and therefore enables all articles of manufacture, materials and processes that depend on the propensity of single-wall carbon nanotubes and ropes of single-wall carbon nanotubes to aggregate. Such entities include composite materials comprising single-wall carbon nanotubes wherein the materials' electrical, mechanical, optical, and/or thermal properties are enhanced by the presence of nanotube networks within the material. Such materials include bulk composite materials, paints, coatings, and adhesives, whose electrical, mechanical, optical, and/or thermal properties depend in part on the presence of nanotube networks therein, electrical circuitry, electronic devices (including batteries, capacitors, transistors, memory elements, current control elements, and switches) whose properties and function depend in part on the presence of nanotube networks therein.

DESCRIPTION OF ILLUSTRATIVE EMBODIMENTS

Figure 1:
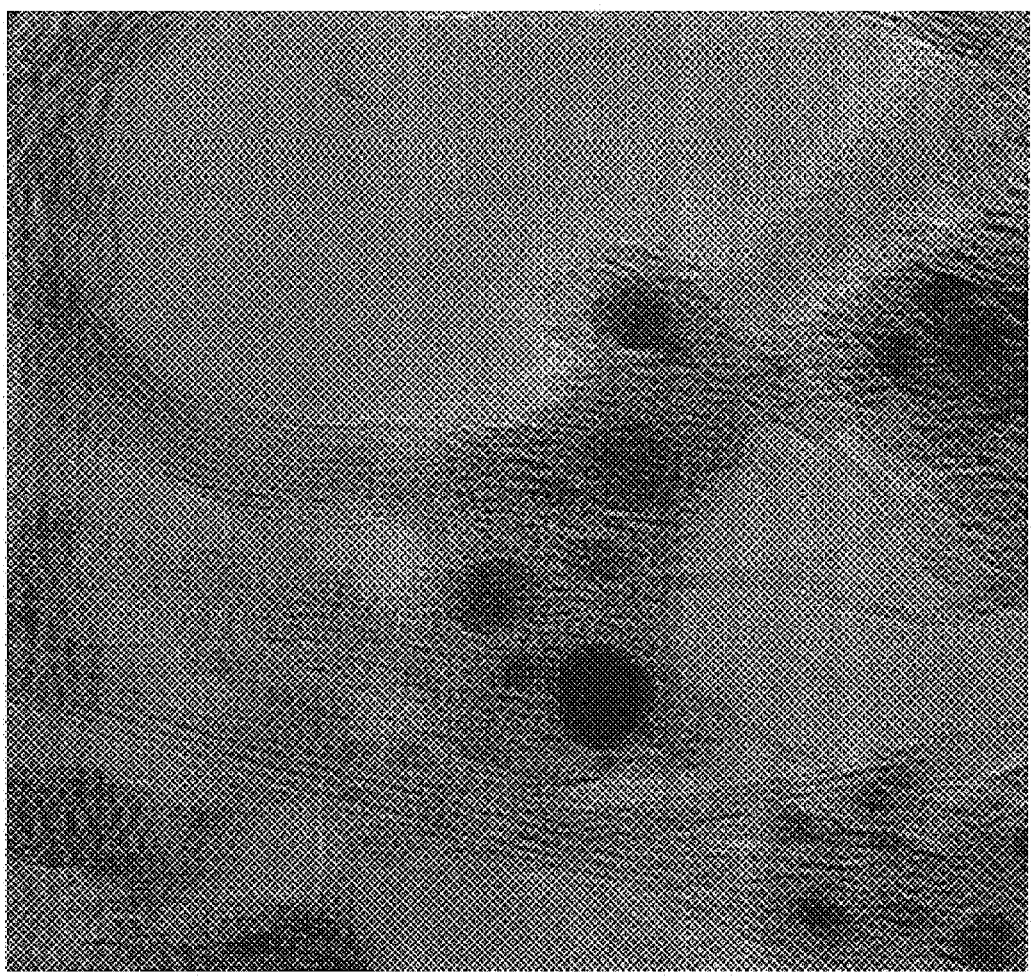
FIG. 1 is a transmission electron micrograph of single-wall carbon nanotube material as-produced by the laser oven method, showing encapsulation of the catalyst particles by graphitic shells of "amorphous carbon."

This invention provides a method for producing highly-purified single-wall carbon nanotube material in which the metal catalyst used in the production process and amorphous carbon generated in the production process are substantially removed. The invention also provides for macroscopic amounts of highly-purified single-wall carbon nanotube material. A "macroscopic amount" means a quantity which can be seen without the aid of magnification. In one embodiment, the material contains less than about 5 wt % metal. In another embodiment of this invention, the single-wall carbon nanotube material contains less than about 1 wt % metal. Yet in another embodiment of this invention, the single-wall carbon nanotube material contains less than about 0.1 wt % metal. Additionally, in an embodiment of the present invention, single-wall carbon nanotube material contains less than about 5 wt % amorphous carbon. In another embodiment of the invention, single-wall carbon nanotube material of this invention contains less than about 1 wt % amorphous carbon and yet in another embodiment of this invention, single-wall carbon nanotube material contains less than about 0.2 wt % amorphous carbon.

This purified material comprises a fundamental improvement in all known products and articles of manufacture that incorporate single-wall carbon nanotube, and it enables new and improved articles of manufacture, including, but not limited to: composite materials with electrical, mechanical, electromagnetic or chemical properties deriving in part from single-wall carbon nanotubes contained therein; electrodes of fuel cells, capacitors or batteries, particularly lithium-ion batteries; catalyst supports, structure-modifying additives for vehicle tires and laminated composites, including high-strength carbon fiber composites, anti-corrosion and other electrochemical materials and coatings; fibers containing or comprised entirely of single-wall carbon nanotube; chemical, physical, and electronic sensors; films and coatings; inks and conducting materials that may be printed in any way; electrically and thermally conductive coatings, electrically and thermally conductive composite materials, electromagnetic and radio-frequency shielding materials; field emission cathodes; biologically-compatible coatings, objects and devices that are inserted or implanted into living organisms; radar-absorbing materials, optically-active materials and devices; components of systems that convert sunlight to electrical energy; electronic devices including transistors, pass elements, capacitors, inductors, resistors, connectors, switches, wires, interconnections devices and antennae at frequencies up to and including optical frequencies; electronic circuit fabrication materials; electrical and thermal conducting materials, transducers, electrical transmission cable, high-strength fiber, and structural elements of machines, buildings, and vehicles. The fundamental improvements enabled by purified single-wall carbon nanotubes in all the foregoing applications derive primarily from the enhanced properties of purified single-wall carbon nanotubes to interact with other single-wall carbon nanotubes, with other materials in composite applications, with other chemicals, and with liquid agents that dissolve or suspend single-wall carbon nanotubes. This enhanced interaction, in turn permits use of lower concentrations of single-wall carbon nanotubes in some applications, and improves the desired electrical, chemical, and/or mechanical properties of the materials, devices and/or other entities comprising single-wall carbon nanotubes in these and other applications.

This invention provides novel means of removing known impurities form as-made single-wall carbon nanotube material that includes such impurities as metal catalyst and amorphous carbon. FIG. 1 shows typical single-wall carbon nanotube material sample produced by the laser-oven process (See Rinzler, et al. *Applied Physics A* 1998 67, 29 ("Rinzler")). Impurities in the form of metal 2–10 nanometer diameter particles and amorphous carbon are evident. Embodiments of this invention include means for removal of impurities as well as the purified material itself. The impurities contain metal-containing species from residual catalyst metal and amorphous carbon. One means disclosed for removing the metal-containing impurities is by chemical reaction with halogen-containing acids, such as HCl, HF, HI and HBr. The resulting metal halide formed by reaction between the halogen-containing acid and the metal can be solubilized for removal. The single-wall carbon nanotubes are filtered and the filtrate is washed with water, followed by methanol or other water-miscible solvent.

Removing the residual catalyst metal impurity from the single-wall carbon nanotube product is problematic because the metal is usually encapsulated by a carbon coating which hinders the access of reactants to the metal. Generally, the product from all known processes for producing single-wall carbon nanotubes contains catalyst impurity in the form of small 2–20 nanometer-diameter particles that are encapsulated with a layer or multiple layers of amorphous carbon. This encapsulation inhibits the access of other chemicals to the metal, and all heretofore-known purification processes leave substantial amounts of metal catalyst because of its relative inaccessibility to chemical attack. The present invention incorporates a means for conversion of the encapsulated metal to other compounds.

Initially the single-wall carbon nanotubes are exposed to a gaseous atmosphere comprising oxygen or carbon dioxide and, optionally, water vapor. The gaseous reagents in this conversion process initially diffuse through defects in the encapsulation and react with the metal to form compounds such as metal oxides and metal hydroxides. The metal oxides and metal hydroxides formed when the oxidizing gases react with metal occupy a larger volume than the original metallic impurity. The larger volume of the metal oxides and hydroxides promotes further cracks, fissures and defects in the carbon that encapsulates the metallic impurities. The more pronounced defects and fissures in the encapsulating carbon, the more accessible the metal-containing species are to the gaseous reagents used for further reaction with the encapsulated metal species. The enhanced cracks and fissures facilitate both the access of the gaseous reagents for reaction with the metal-containing species and the egress of the reacted metal compounds, thereby enabling greater metal removal in the purification process. The oxidation step can be performed at any pressure between about 0.01 and about 100 atmospheres.

Treatment of the oxidized sample with hydrogen can be performed after oxidation. Without being bound by theory, it is believed that the hydrogen treatment reduces the metal oxides, hydroxides and carbides that may be present and that may be more resistant to subsequent metal removal steps than in their reduced states.

Generally, the procedure for purifying single-wall carbon nanotubes comprises the steps of oxidation and reaction of the metal-containing species with a halogen-containing acid. The procedure can further comprise recovering, washing and drying the single-wall carbon nanotube material and annealing at a temperature from about 600° C. to about 1000° C. Furthermore, the procedure can further comprise reduction after the oxidation step.

The oxidation step serves a two-fold purpose. The first purpose is to remove amorphous carbon by oxidizing the amorphous carbon species to carbon oxides. This carbon oxidation is catalyzed by metal in close contact with the amorphous carbon, such as, for example, the carbon that encapsulates the residual catalyst metal-containing species. The other purpose of oxidation is to convert the metal-containing catalyst particles into metal oxides and hydroxides. Since the metal oxides and hydroxides are larger in volume than the metal catalyst particles, they promote further cracking and fracturing of the carbon encapsulation. The oxidation is done with an oxidizing gaseous atmosphere, preferably comprising oxygen or carbon dioxide. The oxygen or carbon dioxide concentration can range from about 1 vol % to about 100 vol %, preferably about 1 vol % to about 30 vol %. Nitrogen and inert gases, such as argon, can be used to dilute the oxygen or carbon dioxide concentration. The oxidation temperature can range from about 200° C. to about 500° C. The oxidation time can range from about 1 hour to about 5 hours, although longer times, such as about 15 hours to about 20 hours, could also be used. The shorter times are preferable when expediency is desired. Water vapor can be added to the oxidizing gaseous atmosphere, and the water vapor concentration can range up to the saturation limit of the gas used to introduce the water vapor into the reaction chamber. The water vapor concentration in the oxidizing gaseous atmosphere can range from about 0.5 vol % to about 50 vol %, but is generally, from about 0.5 vol % to about 10 vol %, and, more typically, 0.5 vol % to about 5 vol %. Water vapor in the oxidation promotes the formation of metal hydroxide species, and can make the single-wall carbon nanotubes more dispersible for subsequent processing. The formation of metal hydroxides, like metal oxides, promotes the fissuring and cracking of the carbon encapsulation.

After oxidation, a reoxidation can be done at higher temperatures of up to about 800° C., either in the presence of a gas comprising water vapor and either carbon dioxide, nitrogen or an inert gas, such as argon. As such high temperatures may cause degradation of the single-wall carbon nanotubes over time, care must be taken to limit the time of exposure of the single-wall carbon nanotubes to such temperatures. The water vapor concentration in the gas mixture used for the reoxidation can range from about 0.5 vol % to about 50 vol %, but is generally, from about 0.5 vol % to about 10 vol %, and, more typically, 0.5 vol % to about 5 vol %.

After oxidation, the reaction chamber can be evacuated by vacuum or purged with nitrogen or an inert gas. A gas comprising hydrogen can be introduced to reduce any metal carbides, oxides or hydroxides present. The temperature of reduction can range from about 250° C. to about 500° C. The concentration of hydrogen gas can range from about 1 vol % to about 100 vol %. The total pressure during reduction can range from about 1 Torr to about 760 Torr.

After oxidation, or hydrogen reduction, if done, the reactor can be evacuated by vacuum or purged with nitrogen or an inert gas, such as argon. The reaction chamber is then cooled to room temperature.

The next step is reaction of the metal-containing impurities to form other metal-containing species that can be solubilized. The metal containing-species can include pure metals, metal carbides, metal oxides and metal hydroxides. The preferred reactions involving the metal-containing impurities are those with halogen-containing acids, such as HCl, HBr, HF, HI, or other halogen-containing compounds that generate halogen-containing acids. Preferably, the halogen-containing acid is HCl. The reaction can be conducted at room temperature with sonication or stirring. The reaction time can be in the range of about 10 minutes to about 20 hours. Preferably, the halogen-containing acid is in an aqueous solution in the concentration range from about 25% of "concentrated" to about 100% of the "concentrated" range. "Concentrated" HCl is in the range of about 36.5 wt % to about 38 wt %, and therefore, the preferred concentration range for HCl is between about 9.1 wt % and about 38 wt %. "Concentrated" HBr is in the range of about 47 to about 49 wt %, and therefore, the preferred concentration range for HBr is between about 11.7 wt % and about 49 wt %. "Concentrated" HF is in the range of about 48 to about 51 wt %, and, therefore, the preferred concentration range for HF is between 12 wt % and about 51 wt %). "Concentrated" HI is in the range of about 47 to about 47.5 wt %, and, therefore, the preferred concentration range for HI is between about 11.7 wt % and about 47.6 wt %). "Concentrated" HCl in the range of about 36.5 wt % and about 38 wt % is more preferred.

In the halogenation reaction step, the metal halide species formed are solubilized in the halogen-containing acid. Thus, the single-wall carbon nanotubes can be removed by filtering the single-wall carbon nanotube material using a filter impervious to halogen acids and washing the single-wall carbon nanotube material first using water, followed by methanol or other water-miscible solvent, such as acetone. After the filtrate is clear, the single-wall carbon nanotube material can be dried. Drying can be done by evaporative drying under ambient conditions, under vacuum conditions, at room temperature, with the application of heat, or combinations thereof.

The single-wall carbon nanotube material can be subjected to one or more subsequent oxidation/halogenation cycles, done either at the same or higher oxidation temperatures. When performing more oxidation/halogenation cycles, the oxidation temperature can be increased in increments of at least about 50° C. up to a temperature of about 500° C. Temperatures greater than 500° C. can be utilized (such as, for example, 800° C.); however, as such high temperatures may cause degradation of the single-wall carbon nanotubes over time, care must be taken to limit the time of exposure of the single-wall carbon nanotubes to such high temperatures.

Optionally, annealing can be done as part of the purification procedure. Annealing has several benefits, including removing more amorphous carbon and correcting defects in the single-wall carbon nanotubes. Annealing can be done in a vacuum or in carbon dioxide, nitrogen or an inert gas, such as argon. Annealing is preferably done at a temperature in the range of about 600° C. to about 1000° C. Annealing time can be on the order of about an hour. Water vapor can be used with carbon dioxide, nitrogen, or any inert gas used in annealing. Without being bound by theory, it is believed that water vapor has the benefit of reducing the susceptibility of adjacent single-wall carbon nanotubes bonding together during annealing. Water vapor in the annealing gas mixture also has the benefit of providing single-wall carbon nanotubes that are more dispersible after purification. The concentration of water vapor during annealing can be in the range from about 0.5 vol % to about 50 vol %, preferably 0.5 vol % to about 10 vol %, and more preferably 0.5 vol % to about 5 vol %. After annealing, the single-wall carbon nanotubes can be cooled a vacuum, in nitrogen or in an inert gas.

Besides providing very pure single-wall carbon nanotube material, the advantage of this purification method employing a liquid-phase step is that the evaporation and drying step, following the liquid-phase step in the method, produces a denser product that is useful as coatings, films and membranes.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

In one embodiment of the present invention, single-wall carbon nanotube material as produced by the laser-oven method (Tubes@Rice, Houston, Tex., see Rinzler) was received dispersed in toluene. It was filtered (Whatman #41) and washed with methanol and then water. The single-wall carbon nanotube material was then homogenized with a high-shear mixer (Polyscience X-520) and filtered repeatedly until the filtrate was clear and colorless. The as-produced single-wall carbon nanotube material is then exposed to a low temperature oxidation at about 200° C. at a pressure of about one atmosphere in a gas mixture comprising approximately 80% inert gas, such as argon, approximately 20% oxygen, and also contains a small amount of about 1% water vapor. Moist air also functions in this process. Oxidation of the metal occurs as the oxygen and water vapor breaches the carbon over-coating of the catalyst particle, and slowly converts the iron catalyst particle to a particle that contains iron oxide and/or iron hydroxide. As the particle is thus converted, it swells and occupies a somewhat larger volume than the original particle. This expansion of particle volume substantially fractures the carbon shell that surrounds the catalyst particle and renders it more vulnerable to chemical attack by oxygen, water vapor and other reagents. The weight of the material being purified increases during the formation of metal oxide/hydroxide and maximum weight gain is achieved by heating at 200° C. for about 15 hours. At this point, the metal can be removed by sonication in aqueous concentrated HCl or other suitable acid for about 10 to 15 minutes. The acid treatment renders the iron as a soluble salt, which dissolves in the acid, but leaves carbon shells and other amorphous carbon behind.

Additional metal removal is achieved by drying the single-wall carbon nanotube material sample and performing the oxidation step again at a higher temperature of 250° C. for an additional time of about 6 hours, and retreating with concentrated HCl. Additional oxidation/HCl cycles at successively higher oxidation temperatures up to about 400° C. ultimately remove almost all of the metal catalyst, resulting in a sample that is less than 0.1% metal by weight. This embodiment incorporates both a single and repeated oxidation/acid-bath cycles.

After acid treatment, the material is annealed at 800° C. for approximately one hour. This process removes additional amorphous carbon, removes the residual carbon oxides and allows some rearrangement of bonding in the tubes to relieve structural defects, resulting in the very clean material.

If the single-wall carbon nanotube material is treated with the procedure described above in the absence of water vapor, the purified product is exceedingly difficult to disperse in any solvent or surfactant system that normally disperses single-wall carbon nanotubes. Cleaned tubes are much more easily dispersed in solvents after cleaning if water is present during oxidation, and annealing, if done.

EXAMPLE 2

Single-wall carbon nanotube material as-produced by the laser-oven method (Tubes@Rice, Houston, Tex., see Rinzler) was received dispersed in toluene. It was filtered (Whatman #41) and washed with methanol and then water.

The single-wall carbon nanotubes were then homogenized with a high-shear mixer (Polyscience X-520) and re-filtered repeatedly until the filtrate was clear and colorless. The as-produced single-wall carbon nanotube material is then exposed to a low temperature oxidation step (200° C.) at a pressure of one atmosphere in a gas mixture comprising approximately 80% inert gas, such as argon, approximately 20% oxygen, and a small amount, of approximately 1%, water vapor. Moist air also functions in this process. Oxidation of the metal occurs as the oxygen and water vapor breaches the carbon over-coating of the catalyst particle, and slowly converts the iron catalyst particle to a particle that contains iron oxide and/or iron hydroxide. As the particle is thus converted, it swells and occupies a somewhat larger volume than the original particle. This expansion of particle volume substantially fractures the carbon shell that surrounds the catalyst particle and renders it more vulnerable to chemical attack by oxygen, water vapor and other reagents. The weight of the material being purified increases during the formation of metal oxide/hydroxide and maximum weight gain is achieved by heating at 200° C. for about 15 hours.

A second catalytic oxidation step is now performed to remove carbon shells without removing the metal. This is achieved by heating the sample that contains the exposed metal oxide/hydroxide to 800° C. in a flow of wet argon or wet $CO_2$. In the presence of a metal catalyst, both $H_2O$ and $CO_2$ react with carbon at this temperature to produce volatile carbon oxides. In this catalytic oxidation, the first carbon to be consumed is that which is in direct contact with the metal. Approximately one hour of heating is sufficient to allow removal of most carbon shells without appreciable removal of single-wall carbon nanotubes. Prolonged reaction will consume single-wall carbon nanotubes. Weighing the sample before and after the complete cleaning process provides a measure of how much metal and carbon has been removed. A typical weight loss for the two-step cleaning procedure is about 40%.

At this point, the metal can be removed by sonication in concentrated HCl or other suitable acid for about 10–15 minutes. The acid treatment renders the iron as a soluble salt, which dissolves in the acid, but leaves carbon shells and other amorphous carbon behind.

After acid treatment, the material is annealed at 800° C. for approximately one hour. This process removes additional amorphous carbon, removes the residual carbon oxides and allows some rearrangement of bonding in the tubes to relieve structural defects, resulting in very clean material.

EXAMPLE 3

In this example, single-wall carbon nanotube material made by the process described in WO 00/26138 (see also Nikolaev, et al., Chemical Physics Letters 1999, 313, 91) is purified by gas-phase oxidation, acid extraction, and high-temperature annealing.

The dominant impurity in an unpurified sample of single-wall carbon nanotube material made by this process is the metal catalyst, comprising primarily iron, which is encased in thin carbon shells and distributed throughout the sample as about 3–5 nm particles. The laser-oven, arc, and supported catalyst methods of producing single-wall carbon nanotubes use different catalysts, but all catalysts are transition metals amenable to the same procedure described below.

In this example, as-produced single-wall carbon nanotube material is first compressed by adding single-wall carbon nanotubes to a filter holder while pulling a vacuum beneath the filter. The single-wall carbon nanotubes are physically compressed onto the filter and then removed and weighed.

A single-wall carbon nanotube sample (typically about 100 mg) is placed in a quartz boat and inserted into a quartz tube that is fixed in a high temperature tube furnace. A gas mixture of 20% $O_2$ in argon, or alternatively air may also be used, is passed through a water bubbler and over the sample at flow rates of about 100 ccm. Flow rates will depend on the amount of sample that is processed. The sample is heated at 200° C. for about 15 hours, and subsequently heated at 800° C. in wet argon for about 1 hour. Wet $CO_2$ may be used in place of wet argon.

Metals are then extracted by sonicating in concentrated HCl solution for 10–20 minutes. The color of the solution is yellow due to $Fe^{++}/Fe^{+++}$ ions. Processed single-wall carbon nanotubes in the HCl solution are filtered onto a 47 mm, 1.0-um pore size PTFE membrane and washed with methanol several times. They are then dried in a vacuum oven at about 100° C. for 2 hours and weighed. Weight loss should be monitored to ensure minimal loss of single-wall carbon nanotubes in the high temperature step. This procedure typically produces single-wall carbon nanotube samples with a metal content of less than 0.4 atomic %. Residual oxygen content in the sample (typically about 5 atomic %) is eliminated by annealing the sample in argon at 800° C.

EXAMPLE 4

Heat the unpurified sample of single-wall carbon nanotube material (made by the process described in WO 00/26138) in wet air at 225° C. for about 18 hours and cool the sample back to below 50° C. in wet air. Sonicate the sample in concentrated HCl for 15 minutes. Separate the single-wall carbon nanotubes by filtration with a filter paper impervious to HCl, wash with water and methanol, and vacuum dry at 50° C. This results in a single-wall carbon nanotube material in which the iron concentration is reduced from the original 4 atomic % to approximately 0.2–0.5 atomic %. Total sample weight loss is approximately 30 wt %, or slightly more than the weight of iron in the original sample.

EXAMPLE 5

Heat the unpurified sample of single-wall carbon nanotube material (made by the process described in WO 00/26138) in wet air at 325° C. for about 2 hours, cooling the sample back to below 50° C. in wet air. Sonicate the sample in concentrated HCl for 15 minutes. Separate the single-wall carbon nanotube by filtration with a filter paper impervious to HCl, wash with water and methanol, and vacuum dry at 50° C. This results in a material in which the iron concentration is reduced from the original 4 atomic % to approximately 0.1–0.2 atomic %. Total sample weight loss is approximately 40%.

EXAMPLE 6

Heat the unpurified sample of single-wall carbon nanotube material (made by the process described in WO 00/26138) in wet air at 225° C. for about 18 hours and cool the sample back to below 50° C. in wet air. Sonicate the sample in concentrated HCl for 15 minutes. Separate the single-wall carbon nanotubes by filtration with a filter paper impervious to HCl, wash with water and methanol, and vacuum dry at 50° C. Anneal the material at 800° C. in argon and water vapor. Total sample weight loss is approximately 45%, but most of the amorphous carbon and virtually all the metal are removed.

EXAMPLE 7

Heat the unpurified sample of single-wall carbon nanotube material (made by the process described in WO 00/26138) in wet air at 325° C. for about 2 hours and cool the sample back to below 50° C. in wet air. Sonicate the sample in concentrated HCl for 15 minutes. Separate the single-wall carbon nanotubes by filtration with a filter paper impervious to HCl, wash with water and methanol, and vacuum dry at 50° C. Anneal the material at 800° C. in argon and water vapor. Total sample weight loss is approximately 55%, but most of the amorphous carbon and virtually all the metal are removed.

EXAMPLE 8

Heat the unpurified sample of single-wall carbon nanotube material (made by the process described in WO 00/26138) in wet air at 150° C. for about 18 hours and cool the sample back to below 50° C. in wet air. Sonicate the sample in concentrated HCl for 15 minutes. Separate the single-wall carbon nanotube by filtration with a filter paper impervious to HCl, wash with water and methanol, and vacuum dry at 50° C. This procedure produces the material shown in FIG. 2a.

EXAMPLE 9

Figures 2A, 2B, 2C:
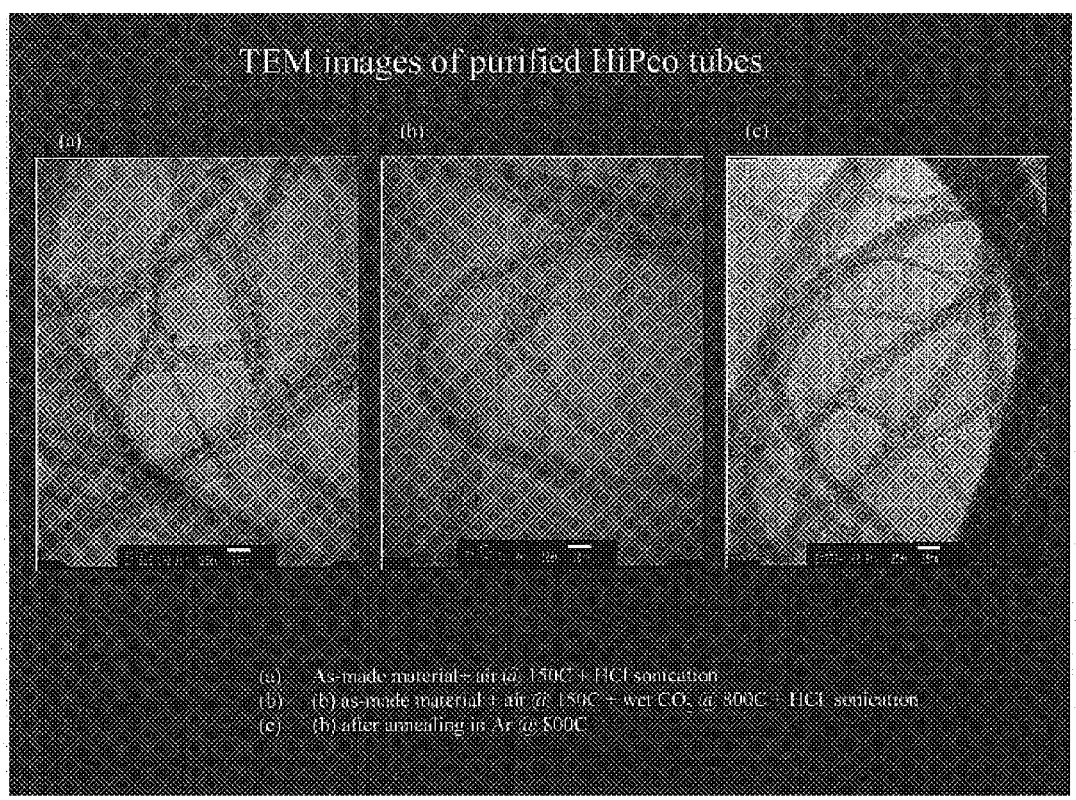
FIG. 2a is a transmission electron micrograph of single-wall carbon nanotube material after being purified according to an embodiment of the invention.
FIG. 2b is a transmission electron micrograph of single-wall carbon nanotube material after being purified according to an alternative embodiment of the invention.
FIG. 2c is a transmission electron micrograph of single-wall carbon nanotube material after being purified according to a second alternative embodiment of the invention.

Heat the unpurified sample of single-wall carbon nanotube material (made by the process described in WO 00/26138) in wet air at 150° C. for about 18 hours and cool the sample back to below 50° C. in wet air. Sonicate the sample in concentrated HCl for 15 minutes. Separate the single-wall carbon nanotubes by filtration with a filter paper impervious to HCl, wash with water and methanol, and vacuum dry at 50° C. Heat the material at 800° C. in carbon dioxide and water vapor. This procedure produces cleaner material as shown in FIG. 2b.

EXAMPLE 10

Heat the unpurified sample of single-wall carbon nanotube material (made by the process described in WO 00/26138) in wet air at 150° C. for about 18 hours and cool the sample back to below 50° C. in wet air. Sonicate the sample in concentrated HCl for 15 minutes. Separate the single-wall carbon nanotubes by filtration with a filter paper impervious to HCl, wash with water and methanol, and vacuum dry at 50° C. Heat the material at 800° C. in carbon dioxide and water vapor. Anneal the material in wet argon at 800° C. for one hour. This procedure produces very clean material as shown in FIG. 2c. "Purification and Characterization of Single-Wall Carbon Nanotubes," I. W. Chiang, et al., Phys. Chem. B, 105, 1157–1161, 2001, "Purification and Characterization of Single-Wall Carbon Nanotubes Obtained from the Gas-Phase Decomposition of CO (HiPco Process)," Phys. Chem. B, 105, 8297–8301, 2001, and "Gas-Phase Purification of Single-Wall Carbon Nanotubes," John L. Zimmerman, et al., Chem. Materials, 12, 1361–1366, 2000, may also provide exemplary procedural and/or other details supplementary 20 to the above disclosure, and are specifically incorporated herein by reference.

What is claimed is:

1. A method for purifying single-wall carbon nanotubes comprising the steps of:
    (a) oxidizing a single-wall carbon nanotube material comprising single-wall carbon nanotubes, amorphous carbon, and a metallic impurity in an oxidizing gaseous atmosphere;
    (b) adding water vapor to the oxidizing gaseous atmosphere; and
    (c) treating the single-wall carbon nanotube material with a solution comprising a halogen-containing acid.

2. The method of claim 1 wherein the oxidizing gaseous atmosphere comprises a gas selected from the group consisting of oxygen, carbon dioxide and mistures thereof.

3. The method of claim 1 wherein the oxidizing gaseous atmosphere comprises oxygen.

4. The method of claim 1 wherein the oxidizing gaseous atmosphere comprises carbon dioxide.

5. The method of claim 1 wherein the water vapor is at a concentration of at least about 0.5 vol % of the oxidizing gaseous atmosphere.

6. The method of claim 1 wherein the oxidizing step is performed at a temperature between about 200° C. and about 500° C.

7. The method of claim 2 wherein the oxidizing gaseous atmosphere further comprises a gas selected from the group consisting of inert gases and nitrogen.

8. The method of claim 1 further comprising reoxidizing the single-wall carbon nanotube material.

9. The method of claim 8, wherein the reoxidizing step is performed at a higher temperature than the oxidizing step.

10. The method of claim 8, wherein the reoxidizing step is performed in a gaseous mixture comprising argon and water vapor.

11. The method of claim 8, wherein reoxidizing step is performed in a gaseous mixture comprising carbon dioxide and water vapor.

12. The method of claim 8, wherein the reoxidizing step is performed in at a temperature at most about 800° C.

13. The method of claim 8, wherein the duration of the reoxidizing step is at most about one hour.

14. The method of claim 1, wherein the halogen-containing acid comprises an acid selected from the group consisting of HCl, HBr, HF, HI and combinations thereof.

15. The method of claim 1, wherein the halogen-containing acid comprises HCl.

16. The method of claim 1, wherein the solution is an aqueous solution.

17. The method of claim 16, wherein the concentration of the halogen-containing acid is present in an amount at least 9 wt % of the aqueous solution.

18. The method of claim 16, wherein the concentration of HCl is present in an amount between about 9 wt % and 38 wt % of the aqueous solution.

19. The method of claim 1, wherein the treating step comprises sonication.

20. The method of claim 1, wherein the treating step comprises stirring.

21. The method of claim 1 further comprising:
    (a) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere; and
    (b) performing a second treating of the single-wall carbon nanotube material after the second oxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

22. The method of claim 21 wherein the second oxidizing step is performed at the same temperature as the oxidizing step.

23. A method for purifying single-wall carbon nanotubes comprising the steps of:
   (a) oxidizing a single-wall carbon nanotube material comprising single-wall carbon nanotubes, amorphous carbon, and a metallic impurity in an oxidizing gaseous atmosphere;
   (b) treating the single-wall carbon nanotube material with a solution comprising a halogen-containing acid;
   (c) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere, wherein the second oxidizing step is performed at a temperature higher than the oxidizing step; and
   (d) performing a second treating of the single-wall carbon nanotube material after the second oxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

24. The method of claim 1 further comprising recovering the single-wall carbon nanotube material to obtain purified single-wall carbon nanotube material.

25. The method of claim 24, wherein the amorphous carbon is present in an amount at most about 5 wt % of the purified single-wall carbon nanotube material.

26. The method of claim 24, wherein the amorphous carbon is present in an amount at most about 1 wt % of the purified single-wall carbon nanotube material.

27. The method of claim 24, wherein the amorphous carbon is present in an amount at most about 0.2 wt % of the purified single-wall carbon nanotube material.

28. The method of claim 24, wherein
   (a) the metallic impurity comprises metal; and
   (b) the metal is present in an amount at most about 5 wt % of the purified single-wall carbon nanotube material.

29. The method of claim 28, wherein the metal is present in an amount at most about 1 wt % of the purified single-wall carbon nanotube material.

30. The method of claim 28, wherein the metal is present in an amount at most about 0.1 wt % of the purified single-wall carbon nanotube material.

31. The method of claim 24, wherein the recovering step comprises filtration.

32. The method of claim 24, wherein the recovering step comprises washing the single-wall carbon nanotube material with water.

33. The method of claim 24, wherein the recovering step comprises washing the single-wall carbon nanotube material with methanol.

34. The method of claim 24, wherein the recovering step comprises drying the single-wall carbon nanotube material.

35. The method of claim 24, wherein the drying step is performed in a vacuum.

36. The method of claim 1 further comprising annealing the single-wall carbon nanotube material.

37. A method for purifying single-wall carbon nanotubes comprising the steps of:
   (a) oxidizing a single-wall carbon nanotube material comprising single-wall carbon nanotubes, amorphous carbon, and a metallic impurity in an oxidizing gaseous atmosphere;
   (b) treating the single-wall carbon nanotube material with a solution comprising a halogen-containing acid and
   (c) annealing the single-wall carbon nanotube material, wherein:
      (i) the annealing step is performed at a temperature between about 600° C. and about 1000° C.; and
      (ii) the annealing step utilizes an annealing gas mixture comprising a gas selected from the group consisting of inert gases, nitrogen, carbon dioxide, and combinations thereof.

38. The method of claim 37, wherein the annealing gas mixture further comprises water vapor.

39. The method of claim 38, wherein the annealing step is performed in a vacuum.

40. A method for purifying single-wall carbon nanotubes comprising the steps of:
   (a) oxidizing a single-wall carbon nanotube material comprising single-wall carbon nanotubes, amorphous carbon, and a metallic impurity in an oxidizing gaseous atmosphere;
   (b) reduction of the single-wall carbon nanotube material; and
   (c) treating the single-wall carbon nanotube material with a solution comprising a halogen-containing acid.

41. The method of claim 40, wherein the reduction step is performed at a temperature between about 250° C. and about 500° C.

42. The method of claim 40, wherein the reduction step is performed with a gas comprising hydrogen gas.

43. A method for purifying single-wall carbon nanotubes comprising the steps of:
   (a) oxidizing a single-wall carbon nanotube material comprising single-wall carbon nanotubes, amorphous carbon, and a metallic impurity in an oxidizing gaseous atmosphere at a temperature between about 200° C. and about 500° C.;
   (b) reoxidizing the single-wall carbon nanotube material at a temperature higher than the oxidizing step; and
   (c) treating the single-wall carbon nanotube material with an aqueous solution comprising HCl.

44. The method of claim 43, wherein the oxidizing gaseous atmosphere comprises oxygen and water vapor.

45. The method of claim 43, wherein the oxidizing gaseous atmosphere comprises carbon dioxide.

46. The method of claim 43, further comprising annealing the single-wall carbon nanotube material at a temperature between about 600° C. and about 1000° C.

47. The method of claim 46, wherein the annealing step is performed in an annealing gas atmosphere comprising a gas selected from the group consisting of carbon dioxide, nitrogen, inert gases, and combinations thereof.

48. The method of claim 47, wherein the annealing gas atmosphere further comprises water vapor at a concentration of at least about 0.5 vol % of the annealing gas atmosphere.

49. The method of claim 43, further comprising annealing the single-wall carbon nanotube material in a vacuum.

50. The method of claim 46, wherein the annealing step is performed in a vacuum.

51. The method of claim 43, wherein the treating comprises stirring.

52. The method of claim 43, wherein the treating comprises sonication.

53. The method of claim 43 further comprising:
(a) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere;
(b) performing a second reoxidizing step of the single-wall carbon nanotube material after the second oxidizing step, wherein the second reoxidizing step is performed at a higher temperature than the second oxidizing step; and
(c) performing a second treating of the single-wall carbon nanotube material after the second reoxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

54. The method of claim 53, wherein the second oxidizing step is performed at a higher temperature than the first oxidizing step.

55. The method of claim 54, wherein the temperature of the second oxidizing step is at most about 500° C.

56. The method of claim 43, wherein the concentration of the HCl is present in an amount at least about 9 wt % of the aqueous solution.

57. The method of claim 44, herein the concentration of the HCl is present in an amount between about 9 wt % and about 38 wt % of the aqueous solution.

58. The method of claim 43 further comprising filtering the single-wall carbon nanotube material.

59. The method of claim 43 further comprising washing the single-wall carbon nanotube material.

60. The method of claim 59, wherein the washing step is performed with methanol.

61. The method of claim 59, the washing step is performed with water.

62. The method of claim 43 further comprising drying the single-wall carbon nanotube material.

63. The method of claim 62, wherein the drying step comprises vacuum drying.

64. The method of claim 62 further comprising heating the single-wall carbon nanotube material in a gaseous mixture comprising carbon dioxide and water vapor after the drying step.

65. The method of claim 64, wherein the heating step is performed at a temperature at most about 800° C.

66. The method of claim 43, further comprising annealing the single-wall carbon nanotube material in a gaseous atmosphere comprising an inert gas.

67. The method of claim 66, wherein the inert gas comprises argon.

68. The method of claim 43 further comprising annealing the single-wall carbon nanotube material in a gaseous atmosphere comprising nitrogen.

69. The method of claim 66, wherein the gaseous atmosphere comprises water vapor.

70. The method of claim 43 further comprising recovering the single-wall carbon nanotube material to obtain purified single-wall carbon nanotube material.

71. The method of claim 70, wherein the amorphous carbon is present in an amount at most about 5 wt % of the purified single-wall carbon nanotube material.

72. The method of claim 70, wherein the amorphous carbon is present in an amount at most about 1 wt % of the purified single-wall carbon nanotube material.

73. The method of claim 70, wherein the amorphous carbon is present in an amount at most about 0.2 wt % of the purified single-wall carbon nanotube material.

74. The method of claim 70, wherein
(a) the metallic impurity comprises metal; and
(b) the metal is present in an amount at most about 5 wt % of the purified single-wall carbon nanotube material.

75. The method of claim 74, wherein the metal is present in an amount at most about 1 wt % of the purified single-wall carbon nanotube material.

76. The method of claim 74, wherein the metal is present in an amount at most about 0.2 wt % of the purified single-wall carbon nanotube material.

77. A method for purifying carbon nanotubes comprising the steps of:
(a) oxidizing a carbon nanotube material comprising carbon nanotubes, amorphous carbon, and a metallic impurity in an oxidizing gaseous atmosphere at a temperature between about 200° C. and about 500° C.;
(b) reoxidizing the carbon nanotube material at a temperature higher than the oxidizing step; and
(c) treating the carbon nanotube material with an aqueous solution comprising HCl.

78. A method for purifying single-wall carbon nanotubes comprising the steps of:
(a) oxidizing a single-wall carbon nanotube material comprising single-wall carbon nanotubes, amorphous carbon, and a metallic impurity in an oxidizing gaseous atmosphere comprising carbon dioxide, wherein the carbon dioxide is at a concentration in the range of about 1 vol % and about 100 vol %; and
(b) treating the single-wall carbon nanotube material with a solution comprising a halogen-containing acid.

79. The method of claim 78 wherein the oxidizing gaseous atmosphere comprises oxygen.

80. The method of claim 78 wherein the oxidizing gaseous atmosphere comprises water vapor.

81. The method of claim 78 wherein the oxidizing gaseous atmosphere comprises oxygen and water vapor.

82. The method of claim 78 wherein the carbon dioxide is at a concentration in the range of about 1 vol % and about 30 vol %.

83. The method of claim 80 the water vapor is at a concentration of at least about 0.5 vol % of the oxidizing gaseous atmosphere.

84. The method of claim 78 wherein the oxidizing step is performed at a temperature between about 200° C. and about 500° C.

85. The method of claim 78 the oxidizing gaseous atmosphere further comprises a gas selected from the group consisting of inert gases and nitrogen.

86. The method of claim 78 further comprising reoxidizing the single-wall carbon nanotube material.

87. The method of claim 86, wherein the reoxidizing step is performed at a higher temperature than the oxidizing step.

88. The method of claim 86, wherein the reoxidizing step is performed in a gaseous mixture comprising argon and water vapor.

89. The method of claim 86, wherein reoxidizing step is performed in a gaseous mixture comprising carbon dioxide and water vapor.

90. The method of claim 86, wherein the reoxidizing step is performed in at a temperature at most about 800° C.

91. The method of claim 86, wherein the duration of the reoxidizing step is at most about one hour.

92. The method of claim 78, wherein the halogen-containing acid comprises an acid selected from the group consisting of HCl, HBr, HF, HI and combinations thereof.

93. The method of claim 78, wherein the halogen-containing acid comprises HCl.

94. The method of claim 78, wherein the solution is an aqueous solution.

95. The method of claim 94, wherein the concentration of the halogen-containing acid is present in an amount at least 9 wt % of the aqueous solution.

96. The method of claim 93, wherein the concentration of HCl is present in an amount between about 9 wt % and 38 wt % of the aqueous solution.

97. The method of claim 78, wherein the treating step comprises sonication.

98. The method of claim 78, wherein the treating step comprises stirring.

99. The method of claim 78, further comprising:
(a) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere; and
(b) performing a second treating of the single-wall carbon nanotube material after the second oxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

100. The method of claim 99 wherein the second oxidizing step is performed at the same temperature as the oxidizing step.

101. The method of claim 99 wherein the second oxidizing step is performed at a temperature higher than the oxidizing step.

102. The method of claim 78 further comprising recovering the single-wall carbon nanotube material to obtain purified single-wall carbon nanotube material.

103. The method of claim 102, wherein the amorphous carbon is present in an amount at most about 5 wt % of the purified single-wall carbon nanotube material.

104. The method of claim 103, wherein the amorphous carbon is present in an amount at most about 1 wt % of the purified single-wall carbon nanotube material.

105. The method of claim 102, wherein the amorphous carbon is present in an amount at most about 0.2 wt % of the purified single-wall carbon nanotube material.

106. The method of claim 102 wherein
(a) the metallic impurity comprises metal; and
(b) the metal is present in an amount at most about 5 wt % of the purified single-wall carbon nanotube material.

107. The method of claim 106, wherein the metal is present in an amount at most about 1 wt % of the purified single-wall carbon nanotube material.

108. The method of claim 106, wherein the metal is present in an amount at most about 0.1 wt % of the purified single-wall carbon nanotube material.

109. The method of claim 102, wherein the recovering step comprises filtration.

110. The method of claim 102, wherein the recovering step comprises washing the single-wall carbon nanotube material with water.

111. The method of claim 102, wherein the recovering step comprises washing the single-wall carbon nanotube material with methanol.

112. The method of claim 102, wherein the recovering step comprises drying the single-wall carbon nanotube material.

113. The method of claim 112, wherein the drying step is performed in a vacuum.

114. The method of claim 78 further comprising annealing the single-wall carbon nanotube material.

115. The method of claim 114, wherein:
(a) the annealing step is performed at a temperature between about 600° C. and about 1000° C.; and
(b) the annealing step utilizes an annealing gas mixture comprising a gas selected from the group consisting of inert gases, nitrogen, carbon dioxide, and combinations thereof.

116. The method of claim 115, wherein the annealing gas mixture further comprises water vapor.

117. The method of claim 114, wherein the annealing step is performed in a vacuum.

118. The method of claim 78 further comprising reduction of the single-wall carbon nanotube material.

119. The method of claim 118, wherein the reduction step is performed at a temperature between about 250° C. and about 500° C.

120. The method of claim 118, wherein the reduction step is performed with a gas comprising hydrogen gas.

121. A method for purifying single-wall carbon nanotubes comprising the steps of:
(a) oxidizing a single-wall carbon nanotube material comprising single-wall carbon nanotubes, amorphous carbon, and a metallic impurity in an oxidizing gaseous atmosphere;
(b) treating the single-wall carbon nanotube material with a solution comprising a halogen-containing acid; and
(c) annealing the single-wall carbon nanotube material at a temperature between about 600° C. and about 1000° C.

122. The method of claim 121 wherein the oxidizing gaseous atmosphere comprises a gas selected from the group consisting of oxygen, carbon dioxide and mixtures thereof.

123. The method of claim 121 wherein the oxidizing gaseous atmosphere comprises water vapor.

124. The method of claim 121 wherein the oxidizing gaseous atmosphere comprises oxygen and water vapor.

125. The method of claim 121 wherein the oxidizing gaseous atmosphere comprises carbon dioxide.

126. The method of claim 123 wherein the water vapor is at a concentration of at least about 0.5 vol % of the oxidizing gaseous atmosphere.

127. The method of claim 121 wherein the oxidizing step is performed at a temperature between about 200° C. and about 500° C.

128. The method of claim 122 wherein the oxidizing gaseous atmosphere further comprises a gas selected from the group consisting of inert gases and nitrogen.

129. The method of claim 121 further comprising reoxidizing the single-wall carbon nanotube material.

130. The method of claim 129, wherein the reoxidizing step is performed at a higher temperature than the oxidizing step.

131. The method of claim 129, wherein the reoxidizing step is performed in a gaseous mixture comprising argon and water vapor.

132. The method of claim 129, wherein reoxidizing step is performed in a gaseous mixture comprising carbon dioxide and water vapor.

133. The method of claim 129, wherein the reoxidizing step is performed in at a temperature at most about 800° C.

134. The method of claim 129, wherein the duration of the reoxidizing step is at most about one hour.

135. The method of claim 121, wherein the halogen-containing acid comprises an acid selected from the group consisting of HCl, HBr, HF, HI and combinations thereof.

136. The method of claim 121, wherein the halogen-containing acid comprises HCl.

137. The method of claim 121, wherein the solution is an aqueous solution.

138. The method of claim 137, wherein the concentration of the halogen-containing acid is present in an amount at least 9 wt % of the aqueous solution.

139. The method of claim 137, wherein the concentration of HCl is present in an amount between about 9 wt % and 38 wt % of the aqueous solution.

140. The method of claim 121, wherein the treating step comprises sonication.

141. The method of claim 121, wherein the treating step comprises stirring.

142. The method of claim 121 further comprising:
(a) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere; and
(b) performing a second treating of the single-wall carbon nanotube material after the second oxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

143. The method of claim 142, wherein the second oxidizing step is performed at the same temperature as the oxidizing step.

144. The method of claim 142 wherein the second oxidizing step is performed at a temperature higher than the oxidizing step.

145. The method of claim 121 comprising recovering the single-wall carbon nanotube material to obtain purified single-wall carbon nanotube material.

146. The method of claim 145, wherein the amorphous carbon is present in an amount at most about 5 wt % of the purified single-wall carbon nanotube material.

147. The method of claim 145, wherein the amorphous carbon is present in an amount at most about 1 wt % of the purified single-wall carbon nanotube material.

148. The method of claim 145, wherein the amorphous carbon is present in an amount at most about 0.2 wt % of the purified single-wall carbon nanotube material.

149. The method of claim 145, wherein
(a) the metallic impurity comprises metal; and
(b) the metal is present in an amount at most about 5 wt % of the purified single-wall carbon nanotube material.

150. The method of claim 149, wherein the metal is present in an amount at most about 1 wt % of the purified single-wall carbon nanotube material.

151. The method of claim 149, wherein the metal is present in an amount at most about 0.1 wt % of the purified single-wall carbon nanotube material.

152. The method of claim 145, wherein the recovering step comprises filtration.

153. The method of claim 145, wherein the recovering step comprises washing the single-wall carbon nanotube material with water.

154. The method of claim 145, wherein the recovering step comprises washing the single-wall carbon nanotube material with methanol.

155. The method of claim 145, wherein the recovering step comprises drying the single-wall carbon nanotube material.

156. The method of claim 155, wherein the drying step is performed in a vacuum.

157. The method of claim 121, wherein the annealing step utilizes an annealing gas mixture comprising water vapor.

158. The method of claim 121, wherein the annealing step is performed in a vacuum.

159. The method of claim 121, wherein further comprising reduction of the single-wall carbon nanotube material.

160. The method of claim 159, wherein the reduction step is performed at a temperature between about 250° C. and about 500° C.

161. The method of claim 159, wherein the reduction step is performed with a gas comprising hydrogen gas.

162. The method of claim 40, wherein the oxidizing gaseous atmosphere comprises a gas selected from the group consisting of oxygen, carbon dioxide and mixtures thereof.

163. The method of claim 40, wherein the oxidizing gaseous atmosphere comprises water vapor.

164. The method of claim 40 wherein the oxidizing gaseous atmosphere comprises oxygen and water vapor.

165. The method of claim 40 wherein the oxidizing gaseous atmosphere comprises carbon dioxide.

166. The method of claim 163 wherein the water vapor is at a concentration of at least about 0.5 vol % of the oxidizing gaseous atmosphere.

167. The method of claim 40 wherein the oxidizing step is performed at a temperature between about 200° C. and about 500° C.

168. The method of claim 162 wherein the oxidizing gaseous atmosphere further comprises a gas selected from the group consisting of inert gases and nitrogen.

169. The method of claim 40 further comprising reoxidizing the single-wall carbon nanotube material.

170. The method of claim 169, wherein the reoxidizing step is performed at a higher temperature than the oxidizing step.

171. The method of claim 169, wherein the reoxidizing step is performed in a gaseous mixture comprising argon and water vapor.

172. The method of claim 169, wherein reoxidizing step is performed in a gaseous mixture comprising carbon dioxide and water vapor.

173. The method of claim 169, wherein the reoxidizing step is performed in at a temperature at most about 800° C.

174. The method of claim 169, wherein the duration of the reoxidizing step is at most about one hour.

175. The method of claim 40, wherein the halogen-containing acid comprises an acid selected from the group consisting of HCl, HBr, HF, HI and combinations thereof.

176. The method of claim 40, wherein the halogen-containing acid comprises HCl.

177. The method of claim 40, wherein the solution is an aqueous solution.

178. The method of claim 177, wherein the concentration of the halogen-containing acid is present in an amount at least 9 wt % of the aqueous solution.

179. The method of claim 176, wherein the concentration of HCl is present in an amount between about 9 wt % and 38 wt % of the aqueous solution.

180. The method of claim 177, wherein the treating step comprises sonication.

181. The method of claim 40, wherein the treating step comprises stirring.

182. The method of claim 40 further comprising:
(a) performing a second oxidizing of the single-wall carbon nanotube material after the treating step, wherein the second oxidizing step is performed utilizing a gaseous atmosphere selected from the group consisting of the oxidizing gaseous atmosphere and a different oxidizing gaseous atmosphere than the oxidizing gaseous atmosphere; and
(b) performing a second treating of the single-wall carbon nanotube material after the second oxidizing step, wherein the second treating step is performed utilizing an acid solution selected from the group consisting of the solution comprising the halogen-containing acid, a first different solution comprising the halogen-containing acid, and a second different solution comprising a different halogen-containing acid.

183. The method of claim 182 wherein the second oxidizing step is performed at the same temperature as the oxidizing step.

184. The method of claim 182 wherein the second oxidizing step is performed at a temperature higher than the oxidizing step.

185. The method of claim 40 further comprising recovering the single-wall carbon nanotube material to obtain purified single-wall carbon nanotube material.

186. The method of claim 185, wherein the amorphous carbon is present in an amount at most about 5 wt % of the purified single-wall carbon nanotube material.

187. The method of claim 185, wherein the amorphous carbon is present in an amount at most about 1 wt % of the purified single-wall carbon nanotube material.

188. The method of claim 185, wherein the amorphous carbon is present in an amount at most about 0.2 wt % of the purified single-wall carbon nanotube material.

189. The method of claim 185, wherein
(a) the metallic impurity comprises metal; and
(b) the metal is present in an amount at most about 5 wt % of the purified single-wall carbon nanotube material.

190. The method of claim 189, wherein the metal is present in an amount at most about 1 wt % of the purified single-wall carbon nanotube material.

191. The method of claim 189, wherein the metal is present in an amount at most about 0.1 wt % of the purified single-wall carbon nanotube material.

192. The method of claim 189, wherein the recovering step comprises filtration.

193. The method of claim 185, wherein the recovering step comprises washing the single-wall carbon nanotube material with water.

194. The method of claim 185, wherein the recovering step comprises washing the single-wall carbon nanotube material with methanol.

195. The method of claim 185, wherein the recovering step comprises drying the single-wall carbon nanotube material.

196. The method of claim 195, wherein the drying step is performed in a vacuum.

197. The method of claim 40 further comprising annealing the single-wall carbon nanotube material.

198. The method of claim 40, wherein:
(a) the annealing step is performed at a temperature between about 600° C. and about 1000° C.; and
(b) the annealing step utilizes an annealing gas mixture comprising a gas selected from the group consisting of inert gases, nitrogen, carbon dioxide, and combinations thereof.

199. The method of claim 198, wherein the annealing gas mixture further comprises water vapor.

200. The method of claim 197, wherein the annealing step is performed in a vacuum.

201. The method of claim 21, wherein the second oxidizing step is performed at a temperature higher than the oxidizing step.

202. The method of claim 36, wherein:
(a) the annealing step is performed at a temperature between about 600° C. and about 1000° C.; and
(b) the annealing step utilizes an annealing gas mixture comprising a gas selected from the group consisting of inert gases, nitrogen, carbon dioxide, and combinations thereof.

203. The method of claim 202, wherein the annealing gas mixture further comprises water vapor.

204. The method of claim 1 further comprising reduction of the single-wall carbon nanotube material.

205. The method of claim 204, wherein the reduction step is performed at a temperature between about 250° C. and about 500° C.

206. The method of claim 204, wherein the reduction step is performed with a gas comprising hydrogen gas.

* * * * *

UNITED STATES PATENT AND TRADEMARK OFFICE
CERTIFICATE OF CORRECTION

PATENT NO. : 6,752,977 B2
DATED : June 22, 2004
INVENTOR(S) : Richard E. Smalley, Robert H. Hauge and Wan-Ting Chiang It is certified that error appears in the above-identified patent and that said Letters Patent is hereby corrected as shown below:

Column 14,
Line 35, should read -- The method of claim 15 --

Column 15,
Line 62, should read -- The method of claim 34 --

Column 17,
Line 29, should read -- The method of claim 43 --

Column 19,
Line 41, should read -- The method of claim 102 --

Column 21,
Line 11, should read -- The method of claim 136 --

Signed and Sealed this

Fifth Day of October, 2004

JON W. DUDAS
*Director of the United States Patent and Trademark Office*